Aug. 22, 1967  V. TRAVIS  3,337,285
VEHICLE REAR VIEW MIRROR WITH CONVEX MIRROR PORTION
Filed Sept. 19, 1963  2 Sheets-Sheet 1
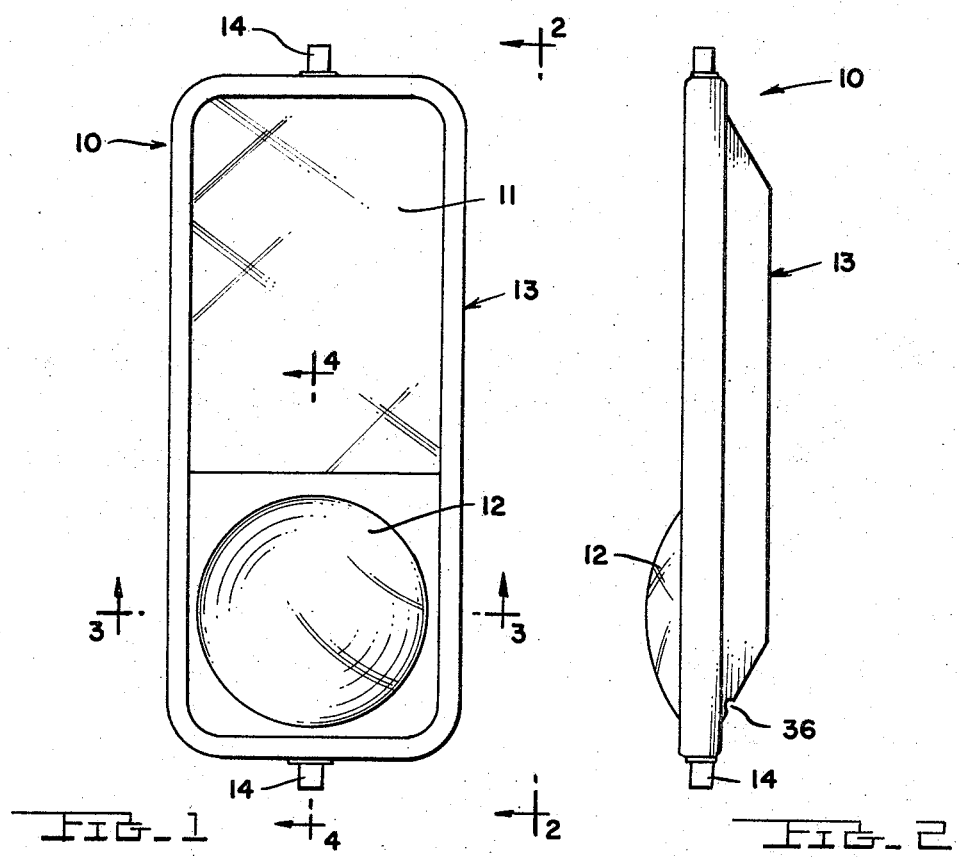
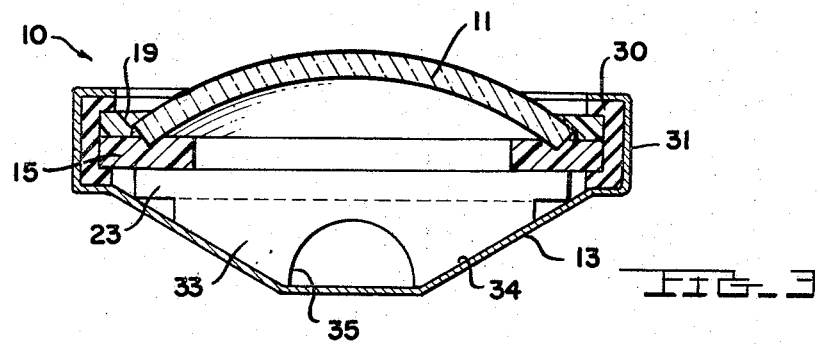
INVENTOR.
VICTOR TRAVIS
BY
Cullen, Sloman & Cantor
ATTORNEYS

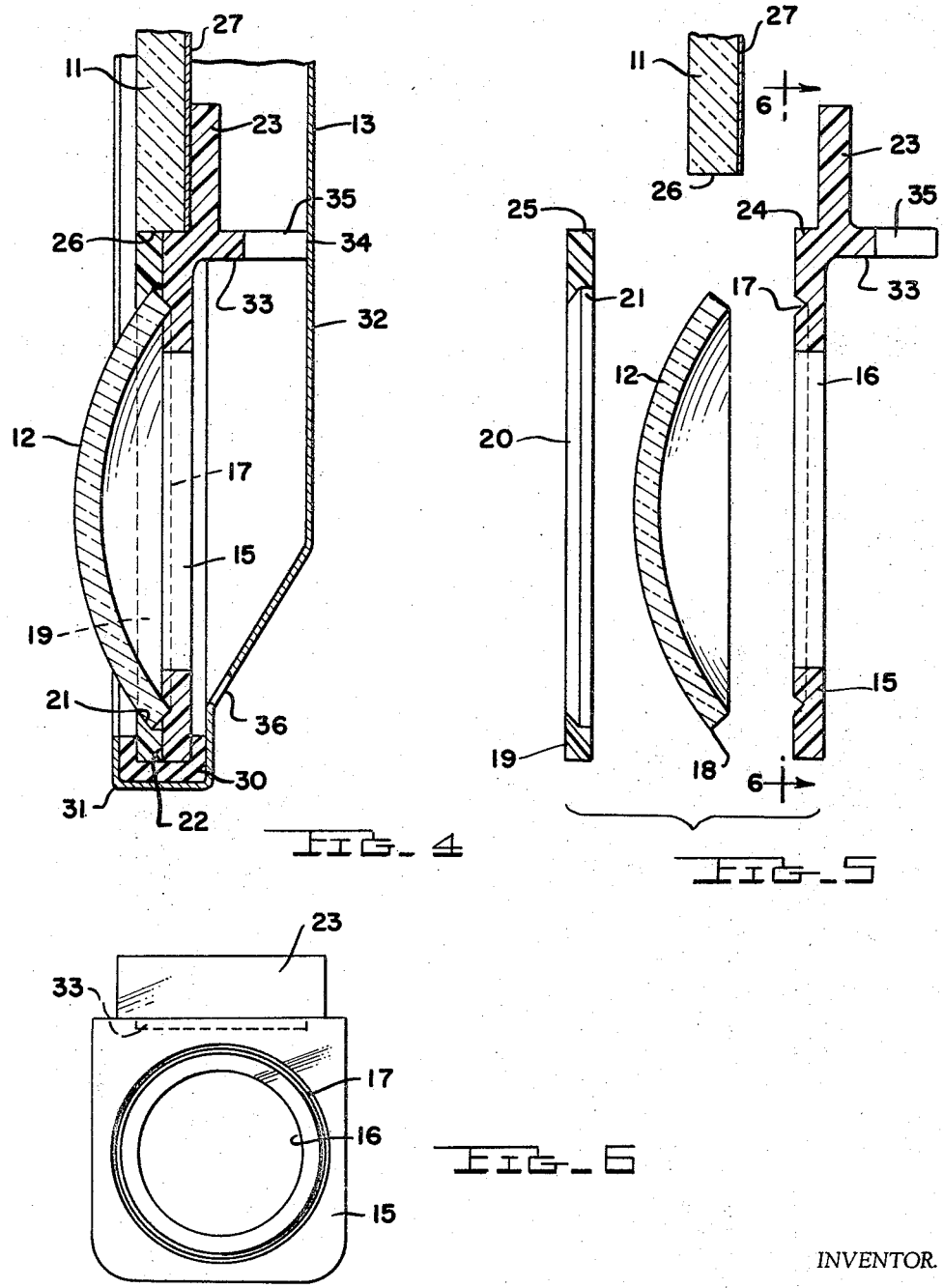

3,337,285
VEHICLE REAR VIEW MIRROR WITH CONVEX MIRROR PORTION
Victor Travis, Detroit, Mich., assignor to Signal-Stat Corporation, a corporation of New York
Filed Sept. 19, 1963, Ser. No. 310,080
4 Claims. (Cl. 350—61)

This invention relates to a rear view mirror, and more particularly, to a composite mirror having a flat mirror portion and a convex mirror portion, useful as an outside rear mirror for trucks and the like.

Vertically elongataed rear view, outside mirrors having an upper flat mirror portion and a lower convex mirror portion have been commercially available for use on trucks, buses and the like. In such mirrors, fastening the lower convex mirror in place has been difficult and expensive and the two mirrors have been easily separable.

Hence, it is an object of this invention to form a rear view mirror having a flat mirror portion and a convex portion, with the convex portion being provided with a separate, rigid mounting means for permanently fastening it to the flat mirror portion.

This and further objects and advantages will become apparent upon reading the following description, of which the attached drawings form a part.

In these drawings:

FIG. 1 is a front elevational front view of the mirror assembly.

FIG. 2 is a side view, taken in the direction of arrows 2—2 of FIG. 1.

FIG. 3 is an enlarged cross-sectional view taken in the direction of arrows 3—3 of FIG. 1, and FIG. 4 is an enlarged cross-sectional view taken in the direction of arrows 4—4 of FIG. 1.

FIG. 5 shows the convex mirror and its mounting part disassembled and in cross-section.

FIG. 6 is a smaller scale view taken in the direction of arrows 6—6 of FIG. 5 and showing one of the mounting parts.

With reference to FIG. 1, the mirror 10 comprises an upper flat mirror 11 and a lower convex mirror 12, both supported and mounted within a support shell 13 having upper and lower studs 14 secured thereto for fastening the shell to conventional brackets (not shown) for mounting the mirror on the side of a truck or the like.

Referring to FIG. 5, the convex mirror is circular and is formed of relatively thin sheet of glass which is mirrored on its rear, concave surface. Its mounting means includes a rear backing plate 15, having a central opening 16, surrounded by an annular, V-shaped notch 17 which receives the rear portion of the peripheral edge 18 of mirror 12. A forward clamping plate 19, having a central opening 20 of a slightly smaller diameter than the peripheral edge 18 of the mirror, with the rear of the edge defining said opening 20 being formed with a rabbet 21, is arranged to overlap the mirror 12 with the rabbet receiving the forward portion of the edge 18. The forward clamping plate is assembled in face to face contact with the rear backing plate and is secured thereto by adhesive 22 (see FIG. 4) for thus tightly clamping the peripheral edge of the mirror between the two plates and mechanically locking it in position.

The rear backing plate 15 is provided with a flat upper extension portion 23 which is rearwardly offset and parallel relative to plate 15 so that the plate upper edge 24 forms a support or shoulder aligned with the upper edge 25 of the forward clamping plate 19.

The lower edge 26 of the flat, vertically elongated, mirror 11 is rested upon the upper plate edges 24 and 25 and its rear mirrored surface 27 is arranged in face to face contact with and adhesively secured to the upper extension portion 23.

Once the mirrors are assembled, as above, a rubber edge bead or channel 30 is arranged around its complete edge. This is received and clamped within channels 31 formed by bending the edges of the shell 13 inwardly (see FIGS. 3 and 4).

The rear portion 32 of the shell is rearwardly bent or bowed relative to the mirrors. A horizontal flange 33, integrally formed with the upper edge of the backing plate 15 and having a free edge 34 shaped to the contours of the back portion 32 of the shell, is arranged to contact, press against and support such back portion and position the mirrors in the shell (see FIGS. 3 and 4). The flange is provided with a central opening 35 and the shell lower rear edge is provided with drain openings 36 so as to permit the escape of moisture which will inevitably seep into and otherwise collect within the shell.

The backing plate 15 and forward clamping plate 19 are preferably molded out of a non-reflective plastic material so that the convex mirror is surrounded by a non-reflective area.

This invention may be further developed within the scope of the following claims. Accordingly, it is desired that the foregoing description be read as being merely illustrative of an operative embodiment of this invention and not in a strictly limited sense.

I now claim:

1. A rear view mirror comprising a rear backing plate, a forward clamping plate, and a circular, forwardly convex, thin wall mirror having a circular peripheral edge forming a continuous annular rear edge portion and a continuous annular forward edge portion; said backing plate having a continuous annular, forwardly opening notch formed in the forward face thereof and the mirror rear edge portion being fitted into said notch; said forward clamping plate having a circular opening formed therein of a diameter slightly less than the diameter of said mirror, with the edge defining said opening being rearwardly rabbeted to overlie and receive the mirror forward edge portion; said forward clamping plate being arranged in face to face contact with and being adhesively secured to the backing plate, with the mirror edge thus being clamped within said notch and rabbet, an integral, flat, extension portion formed on one edge of said backing plate, said extension portion being parallel to but rearwardly offset relative to the forward face of said backing plate to form a shoulder at said one edge; and a flat mirror having an edge abutted against said shoulder and overlapping and being adhesively secured to said extension.

2. A construction as defined in claim 1 and including a support shell for receiving and supporting said plate and mirrors, the shell having a rearwardly bowed back portion having its edges bent into a continuous, inwardly opening channel for receiving and clamping to the edges of the plates and flat mirror; and a rearwardly extending horizontal flange formed integral with the rear face of the backing plate and having a free edge shaped correspondingly to and arranged in contact with the interior of the shell back portion for spacing and rigidifying the back portion relative to said backing plate.

3. A vertically arranged, vertically elongated, rear view mirror having an upper portion and a lower portion; said lower portion being formed of a circular, forwardly convex mirror formed of a thin sheet and having a peripheral edge, and a rear backing plate having an annular, forwardly opening notch formed in its forward face for receiving said peripheral edge, and a forward clamping plate having a circular opening of a diameter slightly smaller than the mirror diameter, the clamping plate being of the same size and being adhesively secured to the backing plate and the edge of the mirror being clamped between said notch and forward clamping plate; said upper portion comprising a flat mirror having a lower edge abutted against the upper edges of said plates, an upwardly extending, flat support portion formed integral with but rearwardly offset relative to said backing plate and being arranged in face to face contact with and adhesively secured to the rear face of said flat mirror; a support shell for receiving and supporting said plates and mirrors, the shell having a rearwardly bowed back portion having its edges bent into a continuous, inwardly opening channel for receiving and clamping to the edges of the plate and flat mirror; and a rearwardly extending, horizontal flange formed integral with the rear face of the backing plate and having a free edge shaped correspondingly to and arranged in contact with the interior of the shell back portion.

4. A construction as defined in claim 3 and including an opening formed in said flange and a drain opening formed in the lower end of said shell.

References Cited
UNITED STATES PATENTS

| | | | |
|---|---|---|---|
| 2,131,444 | 9/1938 | Lateltin et al. | 88—57 |
| 3,104,274 | 9/1963 | King | 88—57 |

JEWELL H. PEDERSEN, *Primary Examiner.*

W. L. SIKES, *Assistant Examiner.*